United States Patent [19]

Ryding

[11] 3,912,117
[45] Oct. 14, 1975

[54] FUEL TANK EXTENDABLE FILLER NECK ASSEMBLY

[75] Inventor: Thomas C. Ryding, Madison Heights, Mich.

[73] Assignee: General Motors Corporation, Detroit, Mich.

[22] Filed: Oct. 29, 1974

[21] Appl. No.: 518,819

[52] U.S. Cl. .............. 220/293; 220/86 R; 220/298; 220/303; 220/304; 222/525
[51] Int. Cl.² B65D 41/06; B65D 51/16; B65B 3/04
[58] Field of Search .......... 220/86 R, 23, 85 F, 293, 220/298, 303, 304, 287, 202, 207, DIG. 20, 8; 222/525, 538

[56] References Cited
UNITED STATES PATENTS

| | | | |
|---|---|---|---|
| 1,117,741 | 11/1914 | Wood, Jr. | 220/86 R |
| 1,786,721 | 12/1930 | Reid | 220/293 |
| 1,947,915 | 2/1934 | Marschall | 222/525 |
| 2,181,969 | 12/1939 | Eshbaugh | 220/293 |
| 2,466,075 | 4/1949 | Bentley et al. | 220/86 R |
| 2,474,974 | 7/1949 | Fulton, Jr. et al. | 220/86 R |
| 2,508,124 | 5/1950 | Stephenson | 220/86 R |
| 2,679,946 | 6/1954 | Friend | 220/303 |
| 2,695,736 | 11/1954 | Punte | 222/538 |
| 3,477,611 | 11/1969 | Niles | 220/86 R |

Primary Examiner—William I. Price
Assistant Examiner—Allan N. Shoap
Attorney, Agent, or Firm—Arthur N. Krein

[57] ABSTRACT

A fuel tank for a vehicle has a main filler neck and an extension filler neck telescopically received within the main filler neck which can be extended when desired to render it accessible to permit filling of the fuel tank with fuel in a conventional manner. The main filler neck is provided with cams and the extension filler neck is provided with retainer tabs to be engaged by a filler cap having a first pair of opposed locking tabs and a pair of locking flanges axially spaced from the locking tabs and arranged whereby to sequentially engage first the extension filler neck and then the main filler neck during attachment of the filler cap.

2 Claims, 6 Drawing Figures

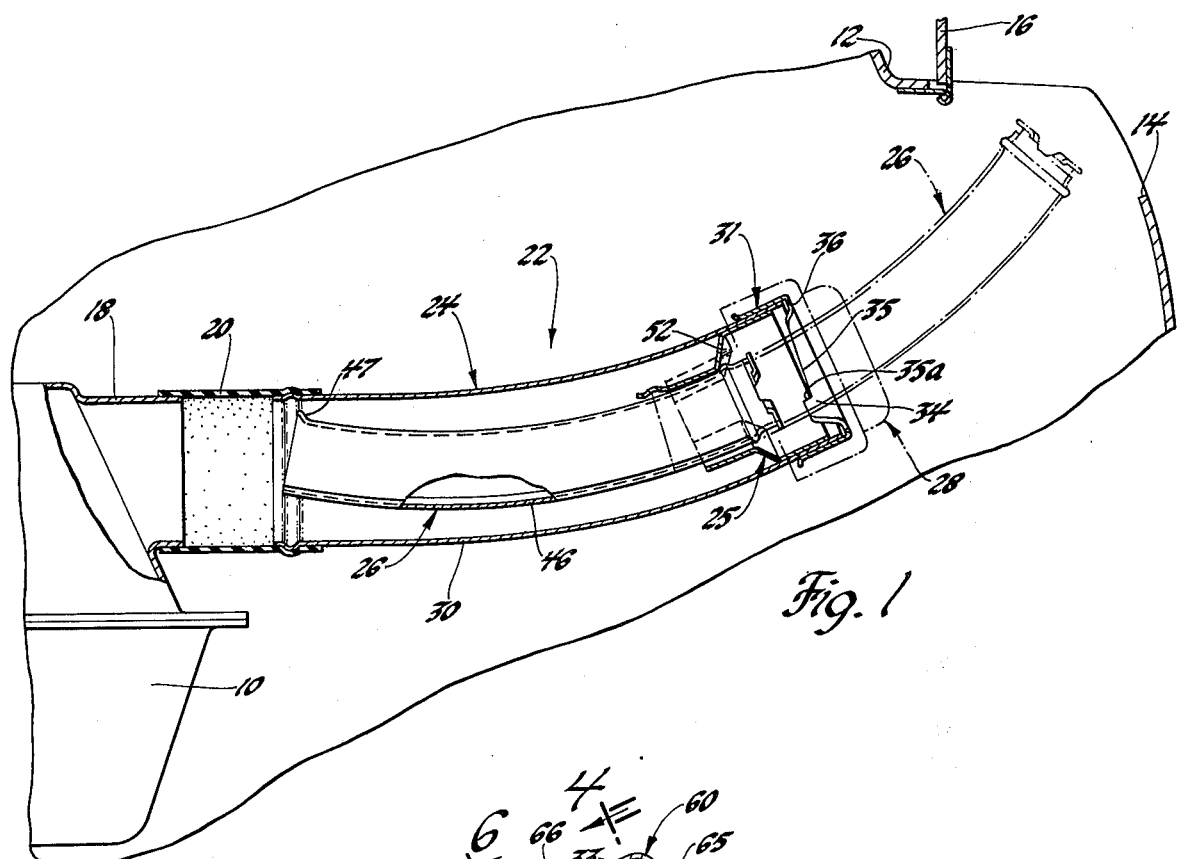
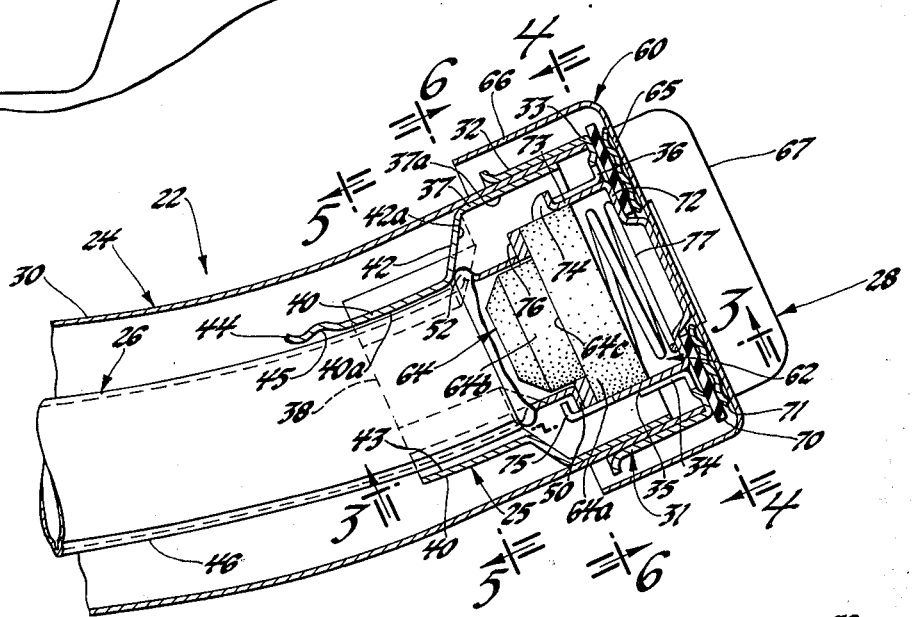
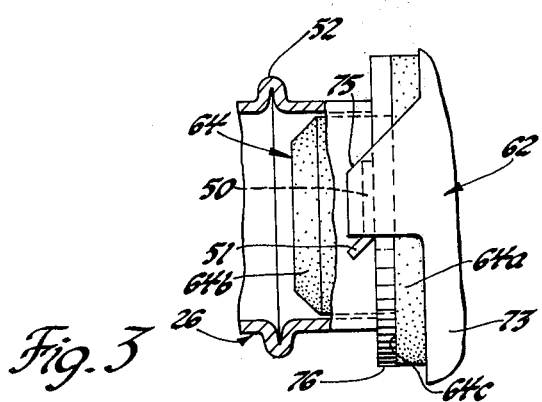

FUEL TANK EXTENDABLE FILLER NECK ASSEMBLY

This invention relates to a motor vehicle fuel tank and, in particular, to an extendable filler neck assembly for such a fuel tank.

In certain motor vehicles, the fuel tank is positioned a considerable distance below or away from a body part of the vehicle. When this is done, it is normally necessary to use a relatively long filler neck extending from the fuel tank to at least closely adjacent to an access opening in the body part to render it accessible when filling the tank with fuel.

It is therefore the primary object of this invention to improve a fuel tank whereby the fuel tank is provided with a short length main filler neck and an extension filler neck normally telescoped within the main filler neck, but which can be extended for use during flowing operations.

Another object of this invention is to improve an extendable filler neck assembly for a fuel tank used in a motor vehicle having both a short length main filler neck and an extension filler neck, both sealed by a common filler cap.

A still further object of this invention is to improve an extendable filler neck assembly for a fuel tank whereby a filler cap of this assembly is sequentially unlocked from a main filler neck and then from an extension filler neck to permit filling of the fuel tank with fuel.

These and other objects of the invention are obtained in an extendable filler neck assembly for a fuel tank, the assembly including a short length main filler neck and an extension filler neck normally telescoped within the main filler neck but which can be extended for use during filling operation. The main filler neck is provided at one end thereof with a cam assembly engaged by a filler cap and the extension filler neck is provided with a cap engaging retainer tabs to be engaged by locking flanges on the filler cap. The operation of this assembly consists of first rotating the filler cap to loosen it from the main filler neck cam assembly thereby engaging it to the extension filler neck and, then pulling on the filler cap to pull out the extension filler neck to its extended position, the locking flanges on the filler cap still engaging the retainer tabs of the extension filler neck. When the extension filler neck reaches its fully extended position, an anti-rotation device between the main filler neck and the extension filler neck prevents rotation of the latter and allows the filler cap to be further rotated until it can be completely disengaged from the extension filler neck. Sealing of the filler necks is accomplished by repetition of the above steps in reverse order.

For a better understanding of the invention, as well as other objects and further features thereof, reference is had to the following detailed description of the invention to be read in connection with the accompanying drawings, wherein:

FIG. 1 is an elevational view, with portions in section, showing a vehicle fuel tank with an extendable filler neck assembly, constructed in accordance with the invention, associated with the fuel tank;

FIG. 2 is an enlarged view of a portion of FIG. 1, with parts in section, showing the filler neck assembly with the extension neck thereof retracted and both filler necks sealed by a filler cap, the parts in section being rotated, as necessary, to illustrate the locking arrangement of the filler cap to both the main filler neck and to the extension neck;

FIG. 3 is a sectional view taken along line 3—3 of FIG. 2, but showing the locking flanges of the filler cap engaging the retainer tabs of the extension filler neck;

Figure 4:
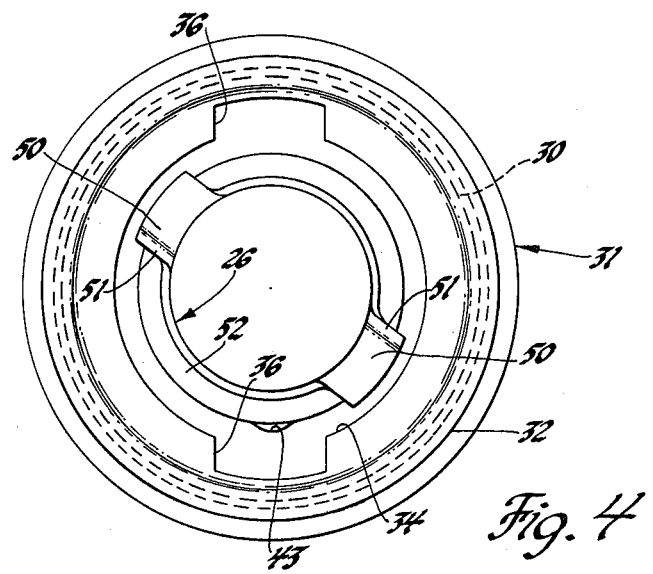
FIG. 4 is a sectional view taken along line 4—4 of FIG. 2, but with the filler cap removed and the main filler neck and extension neck properly orientated with respect to each other.

Referring first to FIG. 1, a conventional fuel tank 10 is shown that is adapted to be mounted in a position, for example, at the rear of a motor vehicle, but spaced from a body part 12 of the vehicle, this body part 12 having an access opening 14 therein which is normally closed by a hinged cover 16. In the embodiment shown, the fuel tank 10 is provided with a tubular inlet member 18 which is suitably connected, as by the hose 20, to one end of an upwardly extending, extendable filler neck assembly, generally designated 22, in accordance with the invention.

As shown, the extendable filler neck assembly 22 includes a short length main filler neck 24 with a centrally apertured guide 25 therein, an extension filler neck 26 slidably engaged in the guide 25 and telescopically received within the main filler neck when in its retracted or inserted position as shown in full line in FIG. 1, but which is extendable to the extended position shown by broken line in FIG. 1 and, a closing or filler cap generally designated 28.

The main filler neck 24 includes a tube 30 which is suitably secured at its lower end, with reference to FIG. 1, to the fuel tank 10, as by hose 20, and which is normally secured intermediate its ends by a suitable support bracket, not shown, fixed to a support element of the vehicle, such as body part 12. The tube 30 at its opposite end, the upper end with reference to FIG. 1, is provided with suitable locking cams which, in the embodiment shown, are provided by means of a filler base 31, fabricated as a separate element and suitably secured to the tube. The filler base 31 includes a cylindrical sleeve 32 which engages the outer periphery of the tube 30, an annular upper sealing or seating surface 33 terminating in a downwardly projecting cylindrical mouth 34 that is provided with a pair of diametrically opposed downwardly projecting cams 35 terminating at cam stops 35a and with a pair of circumferentially spaced, diametrically opposed, axial extending filler cap withdrawal slots 36, as is well known, for the filler cap 28. Cams 35 are inclined to effect pulling of the filler cap 28 in a direction to effect sealing in a manner well known in the art.

In addition, the main filler neck 24 has the centrally apertured guide 25 therein. In the embodiment shown, the guide 25 for the extension filler neck is formed as a separate element which is secured within the upper end of the tube 30. Guide 25 is of cylindrical configuration with at least a portion thereof of an external diameter to engage the inner peripheral surface of the tube 30 for attachment thereto whereby to prevent axial movement of the guide 25 within tube 30. The guide 25 has a stepped bore therethrough including an upper bore of a diameter greater than the diameter of mouth 34 and a lower bore with at least one spline or guide groove therein, the lower bore being of a diameter to slidably receive the extension filler neck 26, the upper bore and lower bore being joined with a tapered shoulder therebetween.

Figure 5:
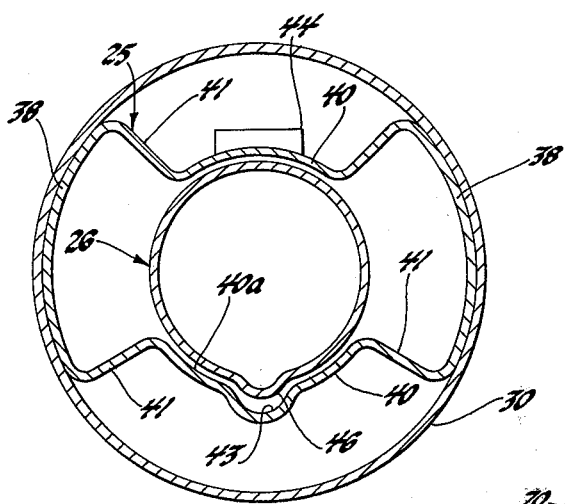
FIG. 5 is a sectional view taken along line 5—5 of FIG. 2.
Figure 6:
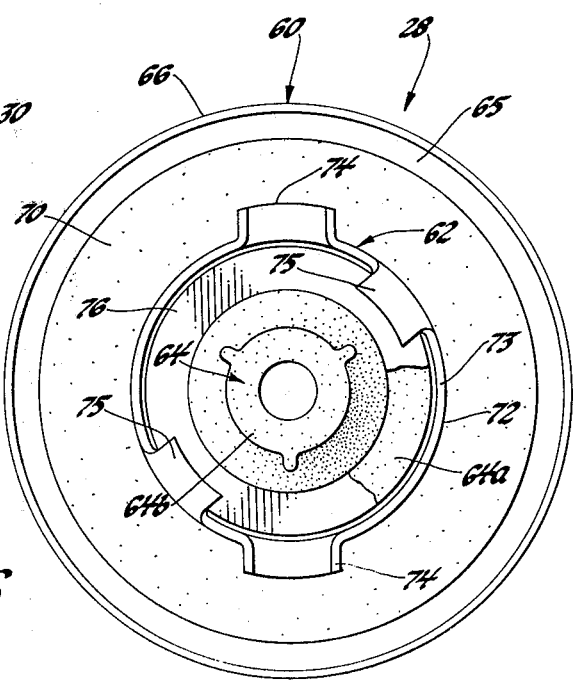
FIG. 6 is a view taken along line 6—6 of FIG. 2 showing the filler cap only.

In the embodiment illustrated, the guide 25 is formed from a short length of pipe and includes, as best seen in FIGS. 2 and 5, an upper cylindrical sleeve 37 of an exterior diameter to engage the inner periphery of the tube 30 and defining an upper bore 37a of a diameter greater than the diameter of mouth 34. The tube is deformed at its lower end to provide diametrically opposed arcuate portions 38 which also engage the inner periphery of the tube 30 and which are circumferentially separated by diametrically opposed, semicylindrical guide portions 40 of an internal diameter therebetween to define a bore 40a to slidably receive the extension filler neck 26. The arcuate portions 38 and the guide portions 40 are integrally connected by webs 41 and these elements in turn are connected to the cylindrical sleeve 37 by the inclined connector webs 42 which provide the tapered shoulder 42a between the upper and lower bores of this guide member.

One of the guide portions 40, the lower one as seen in these figures, is also provided with an axial extending spline or guide groove 43 provided to prevent rotation of the extension filler neck 26, in a manner to be described, while the other guide portion 40 is provided with an axial extending spring stop 44 having a detent notch 45 therein which defines a stop to limit outward movement of the extension filler neck 26 in a manner to be described. Movement of the extension filler neck 26 in the opposite direction is limited by the reduced diameter portion of connector web 42 in a manner which will become apparent.

Extension filler neck 26, in the form of a tube, is provided on the outer periphery thereof with a raised guide bead 46 extending axially along the length of the tube, this bead in the embodiment shown being provided by an upsetting of the wall of the tube. As best seen in FIGS. 2 and 5, guide bead 46 is slidably engaged in the guide groove 43 of the main filler neck 24 to prevent rotation of the extension filler neck relative to the main filler neck and, therefore, guide bead 46 can be considered as part of an anti-rotational means, the other part of this means being the guide groove 43. In addition, the extension filler neck is provided at its lower end, as seen in FIG. 1, with a radially outward extending, flared, bead lock 47, shown diametrically opposite guide bead 46, that is, adapted to be engaged into the detent notch 45 of the spring stop 44 on the filler base whereby to limit outward movement of the extension filler neck from the main filler neck to the position shown by broken lines in FIG. 1, this detent notch 45 and bead lock 47 providing a releasable lock means whereby the extension filler neck is retained in this extended position.

At its upper end, the tube forming the extension filler neck 26 is provided with a pair of diametrically opposed radially outward extending flange or retainer tabs 50, each with a bent stop portion 51 at one end thereof extending back toward the main tube portion of this filler neck, as seen in FIG. 3, the latter to provide rotative stops for the filler cap 28 in a manner to be described. These retainer tabs 50 are diametrically opposed and are positioned relative to the guide bead 46 such that when the extension filler neck is assembled into the main filler neck, these retainer tabs 50 are circumferentially offset from the cams 35 and withdrawal slots 36 on the main filler neck 24, as clearly shown in FIG. 4. Extension neck 26 is provided adjacent to its upper end with an external bead 52, shown as an upset bead, to serve as a stop bead which abuts against the reduced diameter portion of the connector web 42 of the guide in the main filler neck to limit retraction of the extension neck therein and, thereby, position the retainer tabs 50 a predetermined axial distance from the surface of cams 35 of the main filler neck, to permit use of this filler cap in a manner to be described, when the extension neck is in its retracted or inserted position.

The filler cap 28 comprises a cover 60, an internal cup member 62 and a valving assembly 64. The valving assembly 64 is conventional in construction and permits venting of the fuel tank 10 when pressure conditions therein exceed a predetermined level and, accordingly, need not be described in detail since the details of this valving assembly are not essential to an understanding of the subject invention. Additionally, the valving assembly 64 admits air into the fuel tank 10 when vacuum conditions therein exceed a predetermined amount.

The cover 60, in the form of an inverted cup member, includes a circular base lid 65 and a depending annular skirt 66 which projects axially beyond the lower extremity of the cup member 62 and is of an internal diameter to encircle the filler base 31 but out of engagement therewith. A suitable handle 67 is also fixed to the exterior of the circular base lid 65 whereby an operator can readily effect rotation of the filler cap. Additionally, a sealing member, including a diaphragm 70 and a leaf spring 71, is associated with the cover, in a well known manner, so that with the filler cap in locked position, this sealing assembly engages the seating surface 33 of the filler base 31 on the main filler neck 24 thereby sealing the opening into the main filler neck. As the filler cap 28 is removed, this sealing assembly is released from the seating surface to permit restricted pressure release from the fuel tank 10.

The cup member 62, which is inverted and suitably fixed to the base lid 65, includes an annular base 72 suitably fixed to lid 65 of cover 60 and a depending skirt 73 having formed thereon a first pair of diametrically opposed radially outward extending locking tabs 74 and, axially spaced from these tabs a second set of diametrically opposed radially inward bent locking flanges 75. The locking flanges 75 are circumferentially offset at a predetermined angle relative to the locking tabs and are axially spaced therefrom a predetermined distance, all for a purpose which will become apparent.

As shown, the exterior body of valving assembly 64 has an enlarged upper end 64a of a diameter to be loosely slidably received in the cup member 62, a lower or pilot end portion 64b of a reduced diameter such as to be slidably received into the opening in the upper end of the extension filler neck 26, a radial shoulder 64c being formed therebetween. A retainer washer 76 encircles the reduced diameter portion of the valving assembly 64 to seat against the radial shoulder 64c, this retainer washer 76 having an outside diameter corresponding to the diameter of the enlarged upper end of the valving assembly. With this arrangement, both the valving assembly 64 and the retainer washer 76 are reciprocally received within the cup member 62 and are normally biased in one direction, an outward direction, relative to the cup member 62 by a spring 77 positioned within this cup member, that is, when the filler cap 28 is removed, the spring 77 would bias the valving assembly and, specifically, the retainer washer 76 in an outward direction relative to the cup member, outward movement being limited by engagement of the retainer washer 76 against the locking flanges 75, a position not shown in the drawings.

Now assume that the extension filler neck 26 is in the fully extended position, the position shown by broken lines in FIG. 1, and the filler cap 28 is separated from the extension filler neck. To close and retract the extension filler neck 26 and then to cap the main filler neck 24, an operator would first position the filler cap 28 to have the pilot portion 64b of the valving assembly 64 inserted into the opening at the upper end of the extension filler neck 26 with the cap held in a position so that the locking flanges 75 thereon are out of axial alignment with the retainer tabs 50 at the upper end of the extension filler neck thereby allowing the retainer washer 76 to abut against the locking flanges 75.

The operator would then depress the filler cap 28 in an axial direction downward against the retainer tabs 50 with sufficient force to overcome the biasing action of spring 77 whereby the locking flanges 75 can be moved to an axial position below the retainer tabs 50 of the extension filler neck after which the operator would rotate the filler cap in a suitable direction, counterclockwise with reference to FIG. 4, until the locking flanges 75 engage the stop portions 51 on the retainer tabs 50 after which further axial downward pressure can be applied to the filler cap 28 to cause the bead lock 47 to become disengaged from the detent notch 45 in spring stop 44 on the filler base whereby the extension filler neck can be moved from its extended position, shown in broken lines in FIG. 1, to its retracted position, shown in full lines in this figure. That is, the operator would push the extension filler neck inward until the bead 52 thereon engages the reduced diameter portion of the connector web 42 of the guide within the main filler neck. In reaching this position, the lock tabs 74 on the filler cap would be properly aligned with the withdrawal slots 36 of the extension filler neck to permit insertion of the cup member of the filler cap within the mouth of the filler base.

The operator would then rotate the filler cap 28 in a direction, clockwise with reference to FIG. 4, causing the lock tabs 74 to engage and follow the inclined cams 35 to effect locking of the filler cap to the main filler neck in a manner well known in the art. As this occurs, the locking flanges 75 of the filler cap are moved rotatively and axially downward away from the retainer tabs 50 of the extension filler neck, the retainer washer 76 being biased by the spring 77 into engagement with the retainer tabs 50 on the upper end of the extension filler neck.

To effect withdrawal of the extension filler neck 26 to permit filling of the fuel tank with fuel, the above steps would be reversed. That is, an operator would first rotate the filler cap 28 in a counterclockwise direction, with reference to FIG. 4, to effect unlocking of the filler cap relative to the main filler neck and, as this occurs, the locking flanges 75 of the filler cap would be rotated into a position to be in axial alignment with the retainer tabs 50 on the extension filler neck, as shown in FIG. 3. As this occurs, the locking flanges 75 would engage the retainer tabs 50 and would be held axially biased thereagainst by having the retainer tabs 50 sandwiched between the locking flanges 75 and the retainer washer 76 which is continuously outwardly biased by the action of spring 77. With this arrangement, the filler cap 28 cannot be inadvertently released from the extension filler cap.

After engagement of the filler cap 28 with the extension filler neck 26, the operator would then grasp the filler cap to effect withdrawal of the extension filler neck from the main filler neck until the bead lock 47 becomes engaged into the detent notch 45 of the spring stop 44 after which the operator can then rotate the cap in a clockwise direction, again with reference to FIG. 4, to unlock the lock flanges 75 from the retainer tabs 50 of the extension filler neck, the extension filler neck being prevented from rotating during this procedure by the guide bead 46 engaging the guide groove 43.

What is claimed is:

1. An extendable filler neck assembly for a vehicle fuel tank including a cylindrical main filler neck having a lower end adapted for attachment to a fuel tank, and an upper end adapted to receive a filler cap, said upper end including a sealing edge and diametrically opposed cam means with cap withdrawal slots therein, a centrally apertured, guide means fixed within said main filler neck closely adjacent to said upper end, a cylindrical extension filler neck slidably mounted in said guide means and telescopically received within said main filler neck, said extension filler neck having means cooperating with said guide means to limit its axial movement between an extended position and a retracted position relative to said main filler neck and to prevent rotation of said extension filler neck relative to said main filler neck, said extension filler neck having diametrically opposed radially outward extending retainer tabs at its upper end and, a filler cap, said filler cap including a cover member and a cup member carried by said cover member which is axially receivable in said upper end of said main filler neck, said filler cap further including a valving assembly having one end slidably received in said cup member and having a reduced diameter pilot portion at its opposite end extending axially outward from said cup member to be slidably receivable in said extension filler neck, a retainer washer encircling said pilot portion, said cup member having a pair of opposed outward projecting locking tabs and a pair of opposed inwardly projecting locking flanges axially spaced from said lock tab and spring means positioned in said cup member to normally bias said retainer washer into engagement with said locking flanges.

2. An extendable filler neck assembly according to claim 1 wherein said guide means has a stepped bore therethrough including an upper bore of a diameter to receive said filler cap, a lower bore of a diameter to slidably receive said extension filler neck and with an inclined shoulder therebetween, said lower bore having an axial splined groove therein, and wherein said guide means further includes a spring detent means extending axially from the lower end thereof and, wherein said means of said extension filler neck includes an external annular bead on said extension filler neck adjacent to its upper end but axially spaced a predetermined distance from said retainer tabs, said extension filler neck having an outward extending flared bead lock at its opposite end positioned for engagement with said spring detent means and, an outward projecting bead extending longitudinally of said extension filler neck from said annular bead toward said opposite end of said extension filler neck, said outward projecting bead being positioned in a predetermined angular relationship relative to said retainer tabs.

\* \* \* \* \*